United States Patent Office 2,826,536
Patented Mar. 11, 1958

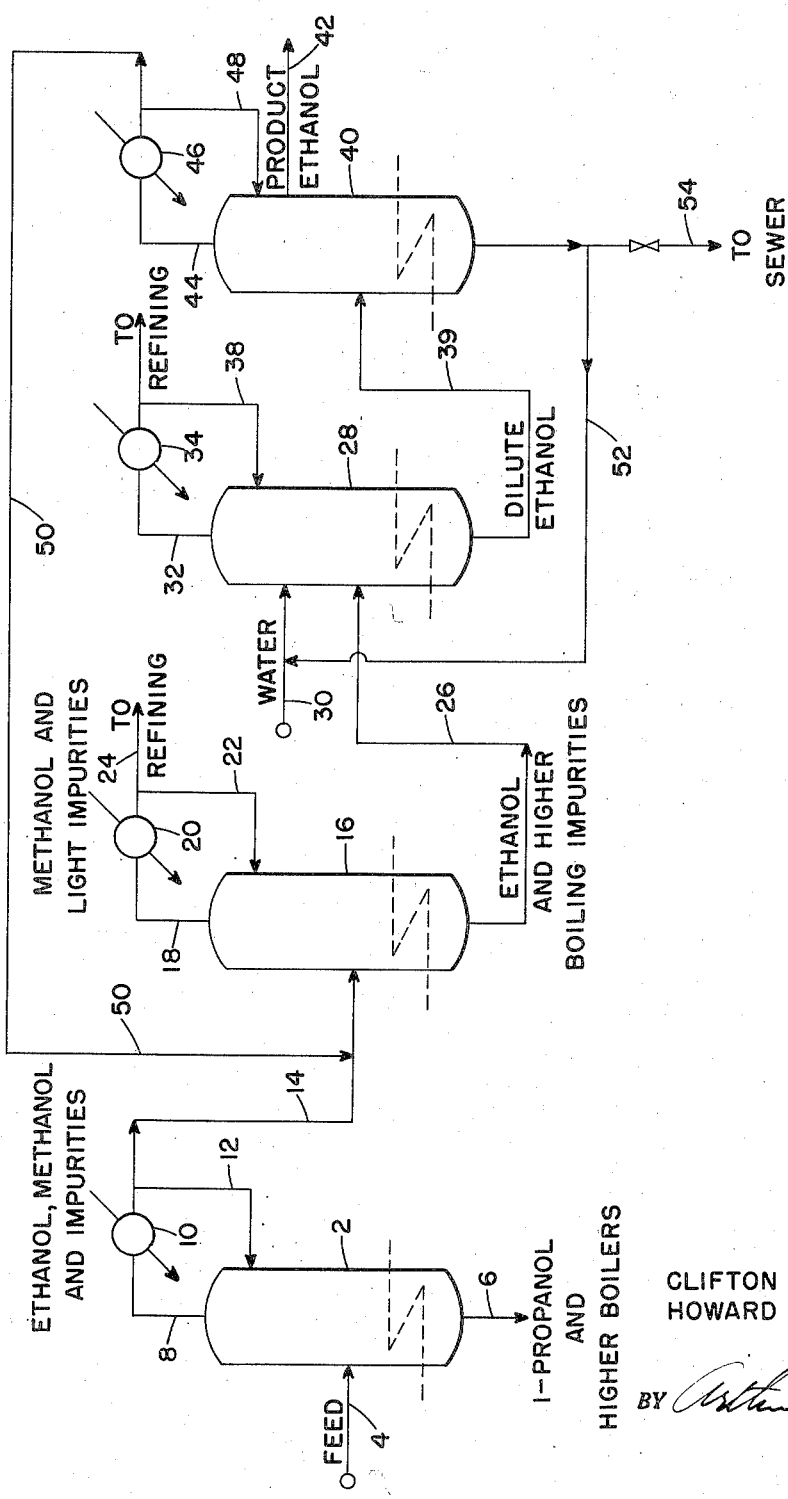

2,826,536

METHOD FOR PURIFICATION OF ETHANOL

Howard Grekel and Clifton S. Goddin, Jr., Tulsa, Okla., assignors to Pan American Petroleum Corporation, a corporation of Delaware Original application December 27, 1952, Serial No. 328,181. Divided and this application January 14, 1957, Serial No. 634,123

5 Claims. (Cl. 202—40)

Our invention relates to a novel method for the separation of various oxygenated organic compounds from one another. More particularly, it pertains to a process for recovering ethanol in highly purified form from aqueous mixtures containing methanol.

While mixtures of the type contemplated by our invention may be found to exist as product streams from other industrial operations, the process of our invention is directed principally to certain fractions of the primary water-soluble chemicals stream produced in hydrocarbon synthesis involving the reduction of carbon monoxide with hydrogen in the presence of a fluidized iron catalyst. In the hydrocarbon synthesis plants now designed for commercial purposes, having capacities of the order of about 6,000 barrels of liquid hydrocarbons per day, the nonacid chemicals present in the aqueous mixtures produced constitute about 75 percent of the total water-soluble chemicals formed, or about 320,000 pounds per day. Accordingly, for economical and other reasons, it is essential that those chemicals be recovered each in as highly purified form as possible.

A mixture typical of those with which we are concerned and the relative concentration in which each component thereof is present are indicated below:

*Table I*

| Compound | Weight Percent | Boiling Point, °C. |
|---|---|---|
| Propionaldehyde | 3.1 | 48.2 |
| Acetone | 14.6 | 56.2 |
| Methanol | 1.0 | 64.5 |
| Butyraldehyde | 1.4 | 74.8 |
| Ethyl Acetate | 1.3 | 77.2 |
| Ethanol | 37.3 | 78.3 |
| Methyl Ethyl Ketone | 5.7 | 79.6 |
| Isopropanol | 2.1 | 82.3 |
| 1-Propanol | 15.2 | 97.2 |
| Secondary Butanol | 2.5 | 99.5 |
| Methyl Propyl Ketone | 1.9 | 102.0 |
| Water | 13.9 | 100.0 |
| Total | 100.0 | |

In recovering a mixture such as that specifically described immediately above, the primary water produced in hydrocarbon synthesis was first subjected to a fractional distillation step (1) to separate the oxygenated chemicals in two groups, the alcohols, aldehydes, and ketones being taken off overhead, and the acids being removed in aqueous solution from the bottom of the still. The overhead thus obtained generally contains from about 15 to 20 weight percent water. This fraction was next distilled (2) to take overhead the 1-propanol and lower boiling compounds, and 1-butanol and heavier compounds were withdrawn as a bottom stream. After removing acetaldehyde from the last-mentioned overhead, a mixture having the typical composition given in Table I was obtained. The latter was next subjected to a fractionation step (3) designed to take overhead as distillate methanol and lighter materials, such as acetone, propionaldehyde, etc., leaving the butyraldehyde, ethanol, and heavier fraction as bottoms. Because of the relatively high proportion of acetone to methanol in the feed to the aforesaid distillation step (3), it was expected that all of the methanol would be removed with the acetone in the form of an azeotrope boiling at 55.7° C. With the type of mixtures involved, however, it was found in actual practice that the removal of methanol in the expected fashion was impossible to accomplish in columns designed for commercial operation. This we have found to be true regardless of the fact that acetone is present in a concentration of from about ten to twenty times greater than that of the methanol, notwithstanding the additional fact that an acetone-methanol ratio of only 7.3:1 is required to satisfy the acetone-methanol azeotrope. Thus, while the key azeotropic systems involved in such a separation, i. e., acetone-methanol (B. P. 55.7° C.) and ethanol-butyraldehyde-water (B. P. 67.2° C.), boil approximately ten degrees apart, it was found that with mixtures of the type discussed above, appreciable quantities of methanol passed into the bottoms along with the butyraldehyde, ethanol, and higher boiling products.

The last-mentioned bottoms fraction referred to above was then subjected to a further distillation operation (4) in which the ethanol and lighter components were taken overhead and the 1-propanol and heavier compounds were removed as bottoms. The expression "ethanol and lighter components" as used herein is intended to refer to components which form lower boiling azeotropes with ethanol and/or water. The overhead containing ethanol was next subjected to a fractional distillation step (5) in which distillation was effected in the presence of a high concentration of water in the distillation zone. Ethanol under such conditions passed into the bottoms, and the latter thereafter again subjected to fractionation (6) to obtain product ethanol. Ethanol produced in this manner, however, contained methanol in concentrations as high as about 1 weight percent, whereas specifications for high grade ethanol permit not more than about .04 weight percent of methanol.

Although ordinarily it is a relatively simple task to separate methanol from ethanol, we have found with mixtures of the type contemplated that such a step is extremely difficult to accomplish, while at the same time causing the bulk of the compounds such as butyraldehyde, methyl ethyl ketone, ethyl acetate, and similar materials to remain in the bottoms with the ethanol. Accordingly, it is to this object, i. e., removing methanol overhead while retaining butyraldehyde and/or the aforesaid ketone, ester, and similar compounds in the bottoms with the ethanol, to which process our present invention is primarily directed.

We have now discovered that the cause of the methanol passing into the bottoms under the condition set forth above is due to the presence of relatively large concentrations of water in the nonacid feed to distillation step (3) mentioned above, i. e., the operation designed to separate methanol and light components from butyraldehyde, ethanol, and heavier compounds. This difficulty we have found can be overcome in effect by reversing the usual sequence of distillation steps (3) and (4) discussed above in connection with the prior art methods that have been used in separating mixtures of this type. In recovering ethanol substantially free of methanol from such mixtures, while retaining butyraldehyde, methyl ethyl ketone, ethyl acetate and similar compounds in the bottoms with ethanol, we have found that the water content of the latter should be reduced to a value of not more than about 7 weight percent. Also, it should be pointed out that at such water concentrations, the total low molecular weight alcohols, i. e., methanol, ethanol, and isopropyl alcohol concentrations, should not be greater than about 60 weight percent (dry basis) with methanol being in a concentration not in excess of from about 1 to about 10 percent based on the weight of the ethanol. In this connection, the expression "low molecular weight alcohols" as used herein is intended to refer to methanol and ethanol and may include isopropyl alcohol. The acetone content of the mixture may vary from about 10 to about 25 percent (dry basis), and the total concentration of water-soluble ketones present may range from about 20 to about 50 percent (dry basis) with acetone generally amounting to from about 50 to about 75 percent of the total ketones.

In accordance with a preferred embodiment of our invention, a feed having a composition corresponding to that used in the aforesaid distillation step (3) is subjected to fractionation under conditions such that ethanol and lighter compounds pass overhead with the methanol, while 1-propanol, a substantial proportion of the water, and heavier components are removed as bottoms. The distillate thus obtained now contains only the azeotropic water associated with the ethanol azeotropes, i. e., not over about 7 weight percent water. This low-water distillate is then subjected to distillation under conditions suitable for the removal overhead of the methanol and lighter fraction, and the withdrawal of the butyraldehyde, ethanol, and heavier fraction from the bottom of the distillation column. This bottoms fraction may then be processed in accordance with distillation steps (5) and (6) discussed above to secure a highly purified product ethanol stream, i. e., containing less than about 0.05 weight percent methanol.

In order to further illustrate the process of our invention, reference is made to the accompanying drawing wherein a feed having the composition specifically set forth in Table I is added to column 2 through line 4. Under the conditions of operation, 1-propanol and high-boiling impurities together with the bulk of the water are withdrawn as bottoms from the system through line 6. Vapors are withdrawn overhead from the column at a temperature of about 73° C. through line 8, condenser 10, and a portion of the resulting condensate returned to the column as reflux through line 12. The bulk of the distillate, which amounts to about 73 weight percent of the feed, is sent through line 14 to column 16. The composition of the feed to column 16 is as follows:

Table II

| Compound: | Weight percent |
| --- | --- |
| Propionaldehyde | 4.3 |
| Acetone | 20.1 |
| Methanol | 1.4 |
| Butyraldehyde | 1.9 |
| Ethyl acetate | 1.8 |
| Ethanol | 51.2 |
| Methyl ethyl ketone | 7.8 |
| Isopropanol | 2.9 |
| Methyl propyl ketone | 2.6 |
| Water | 6.0 |
|  | 100.0 |

Column 16 is operated at a top tower temperature of about 54° C. with vapors of methanol, acetone, and propionaldehyde passing overhead through line 18 and condenser 20, a portion of the condensate being returned to the column through line 22 as reflux. The remainder of the condensate is sent to further refining in a suitable methanol-acetone purification system through line 24. Bottoms at a temperature of about 78° C., containing ethanol and higher boiling compounds, is withdrawn through line 26 and sent to an intermediate section of column 28 where it is subjected to fractional distillation in the presence of from about 90 to 99 mol percent water. This concentration in the distillation zone is maintained by adding water through line 30. The amount of net distillate drawoff is carefully controlled so that ethanol of the desired purity is produced. The quantity of heat supplied to the column is normally in the range of 100 to 150 B. t. u. per pound of bottoms. A minimum amount of heat is required to secure satisfactory stripping of trace impurities from the ethanol at this point. The use of excessive quantities of heat impairs the efficiency of the column due primarily to decreasing water concentrations in the column. The temperatures employed may vary, but for the majority of purposes we have found that the bottom tower temperatures range from about 90° to about 98° C., preferably 96° C. (corrected to atmospheric pressure), and the overhead temperatures range from about 73° to about 78° C., preferably about 76° C. Under these conditions, ester and carbonyl impurities, together with isopropyl alcohol and some ethanol, are carried overhead through line 32, condenser 34, and this distillate sent to further refining through line 36. A portion of this stream is returned as reflux to the top of the column through line 38.

Dilute ethanol withdrawn from the base of column 28 through line 39 is sent to a conventional fractionating column 40 wherein a constant boiling mixture of ethanol and water is removed in the form of a side stream through line 42 at a temperature of about 78° C. The product ethanol thus obtained contains not more than about 0.04 weight percent of methanol. The overhead, which is largely ethanol containing low-boiling impurities, is withdrawn through line 44 and condenser 46. A portion of this stream is refluxed to the column through line 48 and the remainder, containing from 50 to 75 percent of the methanol fed to the column, is recycled to column 16 through line 50. Purity of the ethanol side draw through line 42 may be controlled by the quantity of liquid taken overhead through line 50. Bottoms from column 40, consisting essentially of water, may be recycled to column 28 through line 52 for use as dilution water in the extractive distillation step. Build up of objectionable concentrations of heavy impurities in the system may be prevented by discharging a portion of the bottoms through line 54.

Using a feed of essentially the same composition as that employed in the operation of column 2 and running the latter so as to take overhead only methanol and lower boiling compounds in accordance with prior art procedures, the methanol content of the product ethanol ultimately obtained is found to be about 1 weight percent. In this regard, one of the outstanding advantages of our process over the prior art is the fact that by practicing our invention, it is possible to secure substantially methanol-free ethanol, from mixtures of the type herein contemplated, by the use of commercial fractionating columns, a result which could not be accomplished prior to our invention.

It will be apparent in view of the foregoing description that the process of our invention may be modified in numerous ways without materially departing from the scope thereof. Thus, while the application of our invention has been described principally in connection with the separation of components present in the proportions typical of those found in the water-soluble chemicals stream obtained in the hydrocarbon synthesis process, it is to be strictly understood that our invention is equally applicable to the treatment of mixtures from other sources in which the common components of the aforesaid water-soluble chemicals stream are to be found in similar proportions.

This application is a division of copending application, U. S. Serial No. 328,181, filed December 27, 1952.

We claim:

1. In a process for recovering butyraldehyde and ethanol substantially free of methanol from a mixture derived by first subjecting the primary water stream produced by the Fischer Tropsch synthesis to a first fractional distillation step to separate nonacid oxygenated chemicals comprising aldehydes, including butyraldehyde, ketones, including acetone, and alcohols including ethanol, 1-propanol, 1-butanol and methanol in the form of an aqueous overhead containing from about 15 to 20 weight percent water, thereafter subjecting said overhead to further fractional distillation to recover an overhead (1) consisting essentialy of 1-propanol, lower boiling components and azeotropic water and leaving as a bottoms stream 1-butanol and higher boiling components, overhead (1) containing low molecular weight alcohols not in excess of about 60 weight percent (dry basis), methanol in a concentration of from about 1 to about 10 weight percent based on the weight of the ethanol and acetone in a concentration of from about 10 to about 25 weight percent (dry basis), the steps which comprise subjecting overhead (1) to distillation at a top column temperature ranging from about 73° to about 78.5° C. to produce an overhead (2) consisting essentially of ethanol, methanol, lower boiling components of overhead (1) and not more than about 7 weight percent water; thereafter subjecting overhead (2) to a further distillation step at a top column temperature of from about 54° to about 58° C. to collect an overhead portion containing methanol and lower boiling components, while maintaining said butyraldehyde in the bottoms with said ethanol; and withdrawing a bottoms fraction in which methanol is present in a concentration of less than 0.1 weight percent, based on ethanol present.

2. The process of claim 1 in which said mixture contains from about 1 to about 5 percent butyraldehyde based on the weight of ethanol and lighter components present therein.

3. The process of claim 1 in which methanol, ethanol, 1-propanol and isopropyl alcohol constitute the mixture of water-miscible low molecular weight alcohols employed.

4. In a process for recovering ethanol, butyraldehyde and methyl ethyl ketone substantially free of methanol from a mixture derived by first subjecting the primary water stream produced by the Fischer Tropsch synthesis to a first fractional distillation step to separate nonacid oxygenated chemicals comprising aldehydes, including butyraldehyde, ketones, including methyl ethyl ketone, and alcohols, including methanol, ethanol, 1-propanol and 1-butanol in the form of an aqueous overhead containing from about 15 to about 20 weight percent water, thereafter subjecting said overhead to further fractional distillation to recover an overhead (1) consisting essentially of 1-propanol, lower boiling components and azeotropic water and leaving as a bottoms steam 1-butanol and higher boiling components; overhead (1) containing low molecular weight water miscible alcohols not in excess of about 60 weight percent (dry basis) of the ethanol and lighter components, methanol in a concentration of about 1 to about 10 weight percent based on the weight of the ethanol and a mixture of water soluble ketones in a concentration of from about 20 to about 50 percent (dry basis); the steps which comprise subjecting overhead (1) to distillation at a column top temperature ranging from about 73° to about 78.5° C. to produce an overhead (2) consisting essentialy of methanol, ethanol, lower boiling components of overhead (1) and not more than about 7 weight percent water; thereafter, subjecting overhead (2) to a further distillation step at a temperature of from about 54° to about 58° C. to collect an overhead portion containing methanol and lower boiling components while maintaining said butyraldehyde and methyl ethyl ketone in the bottoms with said ethanol; and withdrawing a bottoms fraction in which methanol is present in a concentration less than 0.1 weight percent based on the ethanol in said fraction.

5. The process of claim 4 in which said ketone fraction is composed of methyl propyl ketone, methyl ethyl ketone, and acetone, and wherein the latter represents from about 50 to about 75 weight percent of said fraction.

References Cited in the file of this patent

UNITED STATES PATENTS

| | | |
|---|---|---|
| 2,382,044 | Fisher | Aug. 14, 1945 |
| 2,454,734 | Darlington et al. | Nov. 23, 1948 |
| 2,588,446 | Wilson | Mar. 11, 1952 |

FOREIGN PATENTS

| | | |
|---|---|---|
| 698,617 | Great Britain | Oct. 21, 1953 |